3,379,477
FLOW CONTROL CARTRIDGE ARRANGEMENT
Charles Beckmeyer, South Magnolia, N.J., assignor to Gulf Oil Corporation, Pittsburgh, Pa., a corporation of Pennsylvania
Filed Apr. 4, 1967, Ser. No. 628,381
10 Claims. (Cl. 302—17)

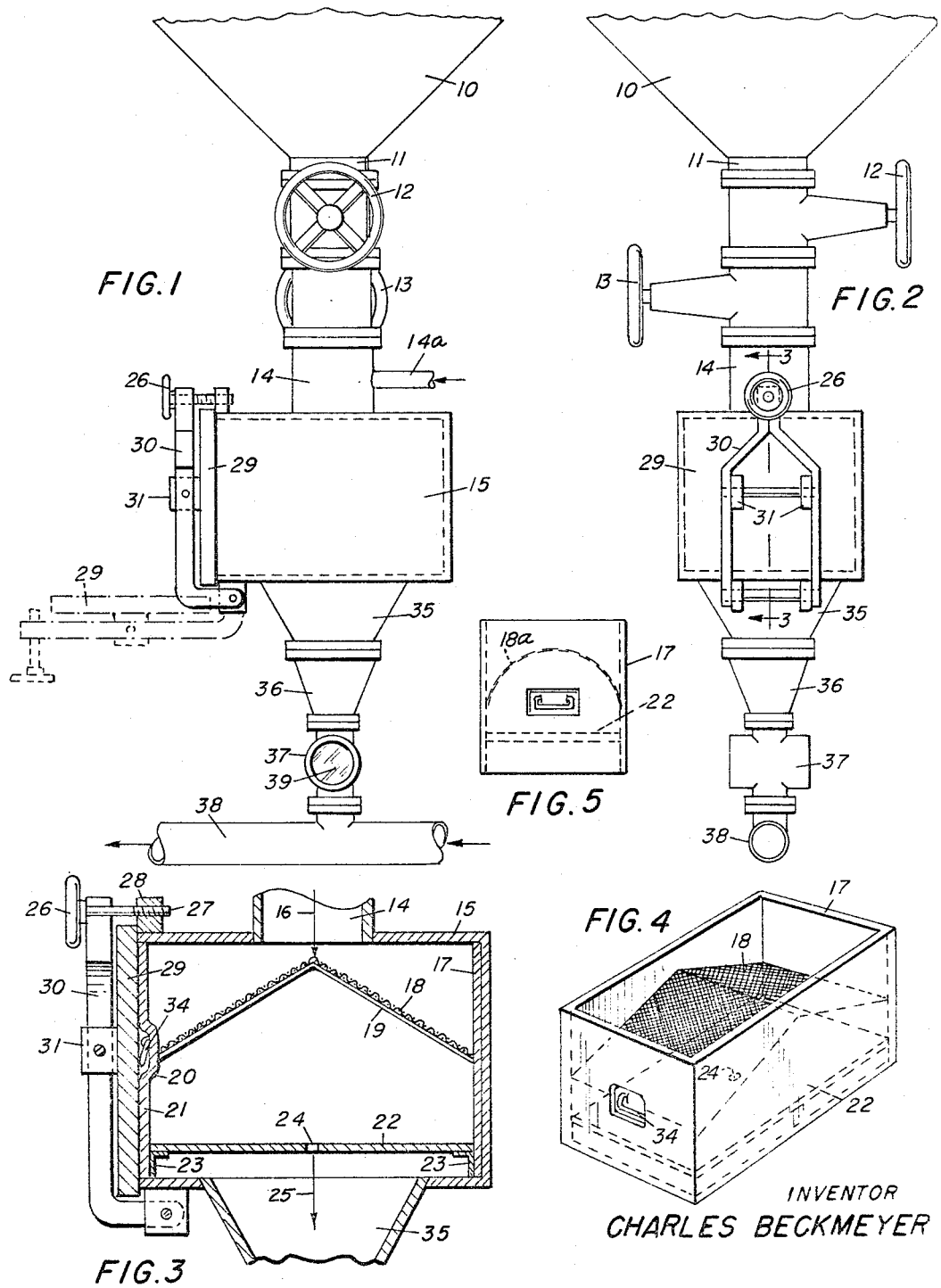

ABSTRACT OF THE DISCLOSURE

A flow control arrangement comprising an easily removable flow control cartridge which contains a strainer and orifice plate combination is provided for the continuous feeding of finely divided solids such as cracking catalysts to a solids circulation system in an essentially uninterrupted manner.

Background of the invention

Fluidized particle contacting systems are employed in the catalytic cracking of hydrocarbons, such as gas oils and the like, to provide high grade motor fuels. In a typical fluidized hydrocarbon conversion system, the fluidized contacting zones will usually comprise a hydrocarbon conversion zone for contact of the hydrocarbon feedstock with a granular mass of catalyst, and a regeneration zone where coke deposits are removed by combustion.

As the catalyst loses activity it becomes necessary to add fresh make-up catalyst to maintain the catalyst activity in the conversion zone at the desired level. It has been the practice to add fresh make-up catalyst by a periodic batch addition. Thus, the charge of fresh catalyst is added once daily in a single portion, twice daily in two portions, or three times daily in three portions, etc. More recently, it has been found to be highly desirable to add fresh catalyst to the circulating catalyst system in smaller quantities at controlled rates. This mode of addition avoids a sudden change in activity of the average catalyst level in the system and prevents a temporary upset of the catalytic conversion zone.

A suitable means for introducing fresh make-up catalyst in a continuous manner is provided by the gravitational flow of fresh catalyst from a catalyst supply hopper which feeds fresh catalyst either to a flow line to the regeneration zone or to a return line from the regeneration zone by means of a mechanical flow regulating device, such as a metering orifice. In this manner the make-up catalyst, alone, or together with the regenerated catalyst is supplied to the main body of circulating catalyst in a continuous manner so as to maintain the desired average catalyst activity of the system at an even level.

Since the quantity of make-up catalyst to be added through the metering orifice is relatively small, as in the order of 1 part in 5,000 to 10,000 of the hourly circulation rate, the size of the required orifice is relatively small. Thus, an orifice diameter on the order of about one-quarter to about one-half inch is generally required. The employment of an orifice of this magnitude makes the system subject to frequent mechanical failures. Thus, various relatively small-sized impurities including a pebble, a piece of paper, a chip of wood, and the like can slip through a screen filter or the like and easily clog the one-quarter inch opening thereby interrupting the continuous flow of finely divided catalyst solids to the system. When this happens, it is imperative to remove the impurities and unclog the orifice opening rapidly or the average catalyst activity of the system will drop below that desired.

The removal of clogging impurities from the orifice plate opening is no simple matter. When the opening becomes clogged, it has been necessary to dismantle the entire orifice plate section. Ordinarily, this involves unbolting the flanges which support the orifice plate section sometimes as many as four times a day. It may take two men an hour to unbolt the flanges and eliminate the impurities from the clogged opening. Not only is this operation time-consuming, but the frequency of removal of the orifice plate section causes the bolts to wear out and requires their frequent replacement by pipefitters.

Summary of the invention

By the present invention an improved arrangement is provided for supplying finely divided make-up contact solids to the main body of circulating solids in a solids circulation system which permits the maintenance of solids activity at the desired level without substantial interruption.

In accordance with this invention, a vertically disposed supply hopper which contains finely divided solid particles, such as catalytic solids, communicates by means of a downflow transfer conduit with the inlet of an open flow control cartridge housing. Disposed within this housing is an easily removable, open, flow control cartridge which contains a strainer disposed above a flow regulating orifice plate with the strainer and the orifice plate being fixedly disposed within the flow control cartridge. The orifice plate has a centrally located opening for passage therethrough of finely divided solids in a continuous manner at a rate dependent upon the diameter of the opening. The opening is in substantial axial alignment with the inlet and outlet of the housing.

The flow control cartridge may be easily and quickly removed from the cartridge housing by means of a housing closure means for the purpose of removing any obstruction from the orifice plate opening and to clean the strainer means, if necessary. The closure, which is located so that the cartridge may be removed in a transverse direction with respect to the flow of particles, may be opened by revolving a single hand-wheel. It is preferred to employ a stand-by flow control cartridge, so that when the cartridge which contains the clogged orifice plate opening is removed, the fresh stand-by cartridge may be immediately inserted. This avoids interruption of the flow of catalyst for the period of time that is normally required to clean the inoperative cartridge.

During actual operation, the finely divided solids pass through the flow control cartridge by means of the strainer means and the opening in the orifice plate in a sequential manner and at a desired predetermined rate, and then pass into the system substantially without interruption. In the case of a circulating catalyst system, the finely divided catalyst solids are passed from the cartridge housing outlet means into a conduit which communicates with the catalyst regeneration zone. Through this conduit is passed a carrier gas, such as an oxygen containing gas, into which the fresh make-up catalyst from the flow controlling orifice is suspended and carried by the gas to subsequently become part of the main body of catalyst.

Thus, it may be seen that a particular advantage of the present improved solid particle feed control system is the provision of an easily removable flow control cartridge which may be cleaned and replaced, or merely replaced by a stand-by cartridge, in a quick and easy manner. Whereas the conventional orifice plate flow control unit required about an hour or more for two men to remove, clean and replace the unit, the flow control cartridge of this invention may be simply removed, cleaned and replaced by one man in about five minutes. Alternatively, if a replacement flow control cartridge which had been previously cleaned is employed, the replacement time is even less than about five minutes.

In addition to the great ease of maintenance which is made possible by the flow control cartridge of this invention, the greatly reduced time of interruption of the continuous flow of catalyst to the system permits an even greater control over the average catalyst activity of the system than was heretofore possible. In addition to the foregoing advantages, it has been found that the strainer-orifice plate combination comprising the flow regulating cartridge of this invention is less subject to clogging than are heretofore employed commercial flow regulating devices and requires less maintenance. Whereas these units may have to be unplugged as many as three to four times a day, the flow control cartridge of this invention only requires service about once or twice a week.

*Brief description of the drawings*

FIGURE 1 is a side elevational view, partly in section of one form of arrangement for feeding make-up catalyst in accordance with the invention;

FIGURE 2 is a front elevational view of the arrangement of FIGURE 1;

FIGURE 3 is a view of enlarged cross section of the flow control cartridge and cartridge housing arrangement taken on line 3—3 of FIGURE 2;

FIGURE 4 is a perspective view of the flow control cartridge shown in section in FIGURE 3, and FIGURE 5 is a side view of a modified form of the flow control cartridge shown in FIGURE 4.

*Description of the preferred embodiment*

As previously discussed, the present arrangement may be desirably employed in the supplying of fresh make-up catalyst in a continuous manner to the main body of catalyst in a catalyst circulation system. The following description will be related to such a system.

Referring particularly to the drawings, there is shown in each of FIGS. 1 and 2 a funnel-shaped lower portion 10 of a catalyst storage hopper (not shown), which contains the finely divided make-up catalyst to be fed to the catalyst circulation system.

The make-up catalyst is discharged from the lower portion 10 of a catalyst supply hopper by means of a line 11, which is provided with gate valves 12 and 13 for shutting off the supply of catalyst particles from the hopper. When the valves 12 and 13 are open, the make-up catalyst can pass into the downflow transfer line 14, whereby the catalyst is fed into the inlet end of the flow control cartridge housing 15.

Referring to FIGURE 3, the flow control cartridge 17 is arranged within the cartridge housing 15 with its open ends adjacent the open end portions of the housing 15. The entering catalyst particles from the catalyst flow passage 16 within the line 14 initially contact a strainer means.

The strainer means may suitably be a screen or perforated plate which preferably has openings which are only slightly smaller than that of the orifice itself. In this manner, the strainer will not permit the passage of any single catalyst particle or impurity which has a size sufficiently large to plug the orifice. For example, when an orifice opening of one-quarter inch in diameter is being employed, the strainer should have an opening of from slightly less than one-quarter inch to about one-sixteenth inch.

Desirably, the surface configuration of the strainer means should be such that it presents as large an exposed surface to the gravitating solids as is possible. A large strainer surface is desirable since this provides a correspondingly large filter area for the accumulation of impurities and oversized catalyst particles, and permits the accumulation of a larger quantity of such materials prior to cleaning. Thus, the flow control cartridge can remain in service for a longer period of time between cleanings. Suitable strainer surfaces include those having a flat or curved design.

As shown in FIGURE 3, the strainer means 18 is held in place by support means 19 and 20, which are permanently attached to the inside walls 21 of the cartridge 17. The strainer 18 is a screen with flat surfaces and is of a sufficiently high mesh number to prevent passage therethrough of the bulk of impurities such as paper, pebbles, wood and the like, which may be present in the catalyst. The size of the strainer openings will depend upon the particle size of the catalyst to be fed and the diameter of the opening 24. For example, a screen strainer having a Tyler standard screen-scale sieve mesh number between about 3 and about 10 mesh may be suitably employed when the average particle size of the catalyst is between about 20 and about 100 microns.

Provided below the strainer 18 is the orifice plate 22 that is fixedly held in place by support brackets 23 which are permanently attached, e.g. by welding to the opposite sides of the inside wall 21 of the cartridge 17. The opening 24 is generally provided in the center of the solid orifice plate 22 and is axially aligned with the catalyst flow passages 16 and 25 when the cartridge 17 is in place in the housing 15. The size of the opening 24 will depend upon the flow rate of catalyst particles which is desired. For example, a suitable orifice plate opening may be between about one-quarter inch and about one-half inch for catalyst particles having an average particle size of between about 20 and about 100 microns.

As shown in FIGURE 1, the downflow transfer conduit 14 is provided with an aeration tap 14a by means of which a gas, such as ordinary air, is introduced for the purpose of aerating or fluidizing the solid particles which pass through conduit 14. By maintaining the particles in motion in this manner, they are more readily able to pass through the strainer 18 and the opening 24.

Referring again to FIGURE 3, the flow control cartridge 17 may be quickly and easily removed from the housing 15 by simply turning the hand-wheel 26 so as to disengage the threaded portion 27 of the shank 28 thereof from the threaded portion of the flange member 29 which is adapted to receive the threaded shank member 27. In so doing, the closure member 29, that is supported by the brace 30 and brackets 31, may be swung from the close position to the open position as shown in FIGURE 1.

When the closure 29 is in the open position, the flow control cartridge 17 may be removed from the housing 15 by merely grasping the recessed handle 34 and slidably pulling the cartridge 17 from the housing 15.

Referring to FIGURE 4, the flow control cartridge 17 is shown in a perspective view and may be more easily seen to comprise a box-like structure, which is open at the top and bottom corresponding to the inlet and outlet ends thereof. As previously described, the strainer 18 and the orifice plate 22 may be supported on their underneath portions, only. This is made possible by the fact that the force from the catalyst particles is on the upper portions of these members. Accordingly, the strainer 18 and the orifice plate 22 may be removed from the cartridge 17 for maintenance purposes by merely lifting the respective members away from the inner wall 21 of the cartridge 22. This is accomplished by first lifting the strainer 18, which is supported on all four edges, vertically out and then raising the orifice plate 22 vertically to the extent necessary for the supported ends of the plate 22 to clear the two support brackets 23 and then permit removal of the orifice plate 22 from the bottom end of the cartridge 17. Obviously, other suitable means may be employed for supporting the strainer 18 and the orifice plate 22 in the cartridge 17.

Referring to FIGURE 5, a modification of the flow control cartridge 17 is shown wherein the strainer means 18a has curved surfaces and is in a semi-cylindrical form, rather than having flat surfaces and being peaked at the center as is the strainer means 18 of FIGURES 3 and 4. The semi-cylindrical strainer means 18a provides more impurity removing surface area than the flat-surfaced strainer 18.

As seen by viewing FIGURE 3, the catalyst particles during actual operation will gravitate downwardly through flow passage 16, strainer 18 and orifice opening 24. The catalyst particles enter flow passage 25 from the opening 24 at the predetermined rate dependent on the diameter of the opening. Thereafter, the catalyst particles freely gravitate through the truncated-conical flow sections 35 and 36, and the sightglass section 37 which are shown in FIGURES 1 and 2. The catalyst particles become entrained in a suspending gas upon entry in conduit 38, such as air, which is passed through conduit 38 in the flow direction indicated in FIGURE 1.

Since the carrier gas is under pressure, it is necessary to provide a slightly higher gas pressure on the gravitating solids in the direction of flow of the catalyst particles when employing the arrangement shown in FIGURES 1 and 2. This prevents any adverse pressure gradient from affecting the flow of the catalyst particles through the orifice opening 24. Accordingly, in practice, the fresh catalyst supply hopper may be pressured to about 23 to 25 p.s.i. with air from the discharge of the air blowers that are used in fluidizing the catalyst in the regenerator. This pressure, plus that resulting from the weight of the catalyst in the hopper, is sufficient to insure a positive flow of the catalyst through the orifice 24 into the transport line 38.

The suspended catalyst particles in line 38 are passed on to become part of the main body of catalyst in the catalyst circulating system. For example, they may be delivered to a catalyst regeneration zone or to the reaction zone (not shown) previously mentioned.

During the operation of the arrangement of the present invention, the flow of catalyst particles is monitored by observing the continuously-flowing particles through the sight glass 39. When the first indication of a plugging or clogging of the orifice opening 24 is observed, i.e. by little or no flow of catalyst particles past the sight glass 39, the valves 12 and 13 are immediately shut. Next, the hand-wheel 26 is rotated to disengage the flange 28 and the closure member 30 is swung to the open position. The flow control cartridge 17 is removed from the housing 15 and is replaced by a similar cartridge which has been previously cleaned and is ready for use.

After the stand-by cartridge has been inserted into the housing 15, the closure member 30 may be pivoted to the closed position. Once the hand-wheel has been rotated so as to secure the closure member 30, the valves 12 and 13 may be opened, and the flow is resumed. The clogged cartridge may now be cleaned, and the catalyst particles that were collected on the plugged orifice plate are returned to the catalyst supply hopper.

Thus, it may be seen that the whole operation may be simply and quickly conducted without the use of tools and with virtually no interruption to the flow of catalyst. In this way the average catalyst activity may be maintained at a constant level.

While the present invention has particular application for the introduction of a controlled amount of fresh make-up cracking catalyst to the circulating body of catalyst in a catalytic cracking operation, it is to be understood that the invention may be suitably adapted to be employed for use in any process where it is necessary to introduce contact particles into a system essentially without interruption to the process or system.

Obviously, many modifications and variations of the invention as hereinabove set forth may be made without departing from the spirit and scope thereof, and therefore only such limitations should be imposed as are indicated in the appended claims.

I claim:
1. Apparatus for continuously adding make-up contact solids to a solids circulation system which comprises a vertically disposed fresh solids storage hopper means for holding a batch of finely divided solids to be introduced at a substantially constant rate to the system, conduit means for discharging finely divided solids from said hopper means communicating with a lower portion of said hopper, an open housing means having an inlet means and an outlet means, said inlet means communicating and in substantial axial alignment with said conduit means, an easily removable, open flow control cartridge member disposed within said housing means, said flow control cartridge member containing an orifice plate having a centrally located opening for passage of finely divided solids therethrough, and a strainer means for preventing passage of impurities to said orifice plate, said orifice plate and said strainer means being transversely and fixedly disposed within said removable flow control cartridge member, said strainer means positioned above said orifice plate, said housing means having a closure means movable to permit removal of said flow control cartridge means from said housing means, said housing outlet means disposed below said orifice plate and in substantial axial alignment with said centrally located opening.

2. Apparatus according to claim 1 wherein the movable closure means is secured by a single hand-wheel.

3. Apparatus according to claim 1 wherein the strainer means has curved surfaces.

4. Apparatus according to claim 1 wherein an aeration tap for maintaining the solids in a fluidized state is provided within the conduit means connecting the lower portion of the hopper means with the housing inlet means.

5. Apparatus according to claim 1 wherein at least one valve means is provided within the conduit means connecting the lower portion of the hopper means with the housing inlet means for preventing the flow of finely divided solids.

6. Apparatus for continuously adding make-up contact solids to a solids circulation system, which comprises an open housing means having an inlet end and an outlet end, an easily removable, open, flow control cartridge member disposed within said housing member and comprising an orifice plate having a centrally located opening and a strainer means, said opening being in substantial axial alignment with said inlet end and said outlet end, said orifice plate and said strainer means being transversely and fixedly disposed within said flow control cartridge, said strainer means positioned above said orifice plate, and said housing means having a closure means movable to permit removal of said flow control cartridge means from said housing member.

7. Apparatus according to claim 6 wherein the strainer means has curved surfaces.

8. An open flow control cartridge for the continuous passage of finely divided solids therethrough, said cartridge having an inlet end in axial alignment with an outlet end, an orifice plate having a centrally-located opening and a strainer means transversely and fixedly disposed within said cartridge, said strainer being disposed adjacent said inlet end, and said orifice plate being disposed adjacent said outlet end.

9. The cartridge of claim 8 wherein the orifice plate and the strainer means are easily removable from the cartridge.

10. The cartridge of claim 8 wherein the strainer means has curved surfaces.

References Cited

UNITED STATES PATENTS

| | | | |
|---|---|---|---|
| 1,758,509 | 5/1930 | Garrison | 209—281 |
| 2,253,698 | 8/1941 | Goldsmith | 55—428 |

ANDRES H. NIELSEN, *Primary Examiner.*